(12) United States Patent
Marshall et al.

(10) Patent No.: US 12,177,082 B2
(45) Date of Patent: Dec. 24, 2024

(54) TECHNIQUES FOR REACTING TO DEVICE EVENT STATE CHANGES THAT ARE SHARED OVER A NETWORK OF USER DEVICES

(71) Applicant: Apple Inc., Cupertino, CA (US)

(72) Inventors: Scott M. Marshall, Los Altos, CA (US); Jiten L Mehta, Milpitas, CA (US); Darren S. Litzinger, Los Gatos, CA (US); Jeremy A. Wyld, San Diego, CA (US); John J. Iarocci, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 17/698,540

(22) Filed: Mar. 18, 2022

(65) Prior Publication Data

US 2022/0303186 A1    Sep. 22, 2022

Related U.S. Application Data

(60) Provisional application No. 63/164,498, filed on Mar. 22, 2021.

(51) Int. Cl.
*H04L 41/12* (2022.01)
*H04L 41/0681* (2022.01)

(52) U.S. Cl.
CPC .......... *H04L 41/12* (2013.01); *H04L 41/0681* (2013.01)

(58) Field of Classification Search
CPC ............. H04L 12/2827; H04L 41/0681; H04L 41/0816; H04L 41/12
See application file for complete search history.

(56) References Cited

U.S. PATENT DOCUMENTS

| | | | | |
|---|---|---|---|---|
| 9,311,811 | B1* | 4/2016 | Szewczyk | G05B 19/042 |
| 9,613,523 | B2* | 4/2017 | Davidson | G05B 19/0428 |
| 9,848,404 | B2* | 12/2017 | Song | H04L 67/12 |
| 10,001,759 | B2* | 6/2018 | Gupta | H04L 12/2816 |
| 10,051,600 | B1* | 8/2018 | Zhong | H04L 67/12 |
| 10,149,278 | B2* | 12/2018 | Borges | H04W 48/16 |
| 10,567,445 | B2* | 2/2020 | Logue | H04L 61/4511 |
| 10,623,312 | B2* | 4/2020 | Chiang | H04L 47/32 |

(Continued)

FOREIGN PATENT DOCUMENTS

| | | | | |
|---|---|---|---|---|
| EP | 3154240 A1 * | 4/2017 | | G08B 25/001 |
| EP | 3154240 B1 * | 12/2021 | | G08B 25/001 |

(Continued)

*Primary Examiner* — Eric Nowlin
(74) *Attorney, Agent, or Firm* — Kilpatrick Townsend & Stockton LLP

(57) ABSTRACT

Techniques are disclosed for coordinating state information between devices in a network of devices. In one example, a first user device can obtain event information identifying an event (e.g., triggering of an alarm) associated with another user device and state information identifying a state of the other device. The first user device can report the state and event information to devices in the network. Observers corresponding to each user device can identify the occurrence of the event corresponding to the event information for each user device. An action (e.g., output an audio chime) can be performed by each device with an observer that identifies the occurrence of the event corresponding to the event information for each user device.

20 Claims, 6 Drawing Sheets

(56) References Cited

U.S. PATENT DOCUMENTS

| | | | |
|---|---|---|---|
| 10,693,719 B2* | 6/2020 | Klausen | H04L 69/18 |
| 10,805,370 B2* | 10/2020 | Alsina | H04N 21/488 |
| 10,885,917 B2* | 1/2021 | Schairer | H04L 12/282 |
| 10,924,343 B1* | 2/2021 | Shukla | H04L 67/104 |
| 11,294,786 B2* | 4/2022 | Degaonkar | G06F 11/3006 |
| 11,324,074 B2* | 5/2022 | Klausen | H04L 69/18 |
| 11,425,673 B2* | 8/2022 | Peter | H04W 60/06 |
| 11,523,190 B1* | 12/2022 | Kuang | H04N 21/478 |
| 11,538,477 B2* | 12/2022 | Schairer | G10L 15/22 |
| 11,853,191 B2* | 12/2023 | Degaonkar | H04L 41/069 |
| 2014/0241354 A1* | 8/2014 | Shuman | H04L 67/51 370/390 |
| 2015/0109112 A1* | 4/2015 | Fadell | G08B 19/005 340/328 |
| 2015/0373751 A1* | 12/2015 | Turon | H04W 12/069 370/254 |
| 2015/0373752 A1* | 12/2015 | Turon | H04L 63/10 370/254 |
| 2015/0373753 A1* | 12/2015 | Turon | H04W 12/088 370/254 |
| 2016/0041534 A1* | 2/2016 | Gupta | H04W 4/70 700/275 |
| 2016/0163186 A1* | 6/2016 | Davidson | G06Q 50/06 340/506 |
| 2017/0094638 A1* | 3/2017 | Borges | H04W 8/005 |
| 2017/0149614 A1* | 5/2017 | Zheng | H04L 41/12 |
| 2017/0251450 A1* | 8/2017 | Song | H04L 67/12 |
| 2018/0212826 A1* | 7/2018 | Klausen | H04L 41/042 |
| 2019/0028996 A1* | 1/2019 | Achamola | H04M 1/72448 |
| 2019/0036772 A1* | 1/2019 | Agerstam | H04L 67/566 |
| 2020/0092687 A1* | 3/2020 | Devaraj | H04R 3/005 |
| 2020/0170074 A1* | 5/2020 | Klausen | H04L 41/0226 |
| 2020/0175976 A1* | 6/2020 | Rakshit | H04L 67/125 |
| 2020/0211546 A1* | 7/2020 | Schairer | G10L 15/22 |
| 2021/0007071 A1* | 1/2021 | Peter | H04W 56/004 |
| 2021/0090566 A1* | 3/2021 | Schairer | H04W 4/70 |
| 2021/0297483 A1* | 9/2021 | Ottaviano | H05B 47/1995 |
| 2022/0303888 A1* | 9/2022 | Wyld | H04W 76/14 |
| 2023/0093016 A1* | 3/2023 | Shi | H04W 48/16 370/329 |

FOREIGN PATENT DOCUMENTS

| | | | | |
|---|---|---|---|---|
| KR | 20170101518 A | * | 9/2017 | |
| KR | 101793630 B1 | * | 11/2017 | |
| WO | WO-2017150781 A1 | * | 9/2017 | H04L 67/12 |
| WO | 2020046270 | | 3/2020 | |

* cited by examiner

TECHNIQUES FOR REACTING TO DEVICE EVENT STATE CHANGES THAT ARE SHARED OVER A NETWORK OF USER DEVICES

CROSS-REFERENCE TO RELATED APPLICATION(S)

The present application claims priority to U.S. Provisional Patent Application No. 63/164,498, titled "TECHNIQUES FOR REACTING TO DEVICE EVENT STATE CHANGES THAT ARE SHARED OVER A NETWORK OF USER DEVICES," and filed Mar. 22, 2021, the entirety of which is incorporated by reference herein.

BACKGROUND

Many network environments include multiple devices capable of performing various processing tasks. For example, a network environment can include a combination of computing devices, mobile devices, sensors, or internet of things (IoT) devices. In some instances, the devices in a network environment can be separated into clusters of devices within the network environment and assigned to a leader within each cluster. One or more of the clusters can work together to manage an automated environment within the network. However, given the many various types of devices and processing tasks, many challenges exist in managing the automated environment.

SUMMARY

Some embodiments of the present disclosure can provide methods, systems, and computer-readable media for coordination of event and/or state information between devices in a network. In some examples, a first user device can report event and/or state information from a device detecting an event to a plurality of user devices in a network. The one or more observers associated with user devices in the network can identify an occurrence of an event corresponding to the event information. In response to the one or more observers identifying the occurrence of an event corresponding to the event information, an action can be performed that corresponds with the event.

According to one embodiment, a method is disclosed. The method can include identifying, by a first user device of a plurality of user devices in a mesh, a connection with a second user device that is also connected to the plurality of user devices in the mesh. The method can also include determining, by the first user device, that the first user device is a leader device for the mesh. The method can also include receiving, by the first user device, state information from the second user device that identifies a state associated with a third user device that is connected to the second user device and is outside of the mesh. The method can also include receiving, by the first user device, event information from the second user device that identifies an event associated with the third user device.

The method can also include persisting, by the first user device, the state information and the event information. The method can also include reporting, by the first user device to the plurality of user devices in the mesh, the state information and the event information. The method can also include identifying, by the first user device, one or more observers configured to identify an occurrence of an event corresponding to the event information. The one or more observers can be registered with the first user device or any of the plurality of user devices in the mesh. The method can also include reporting, by the first user device, the occurrence of the event to the observer registered on the first user device. This can be performed in accordance with identifying an observer of the one or more observers being registered on the first user device and with identifying the occurrence of the event corresponding to the event information. The method can also include performing, by the observer registered on the first user device, an action based at least in part on the reporting of the occurrence of the event.

DETAILED DESCRIPTION

Figure 1:
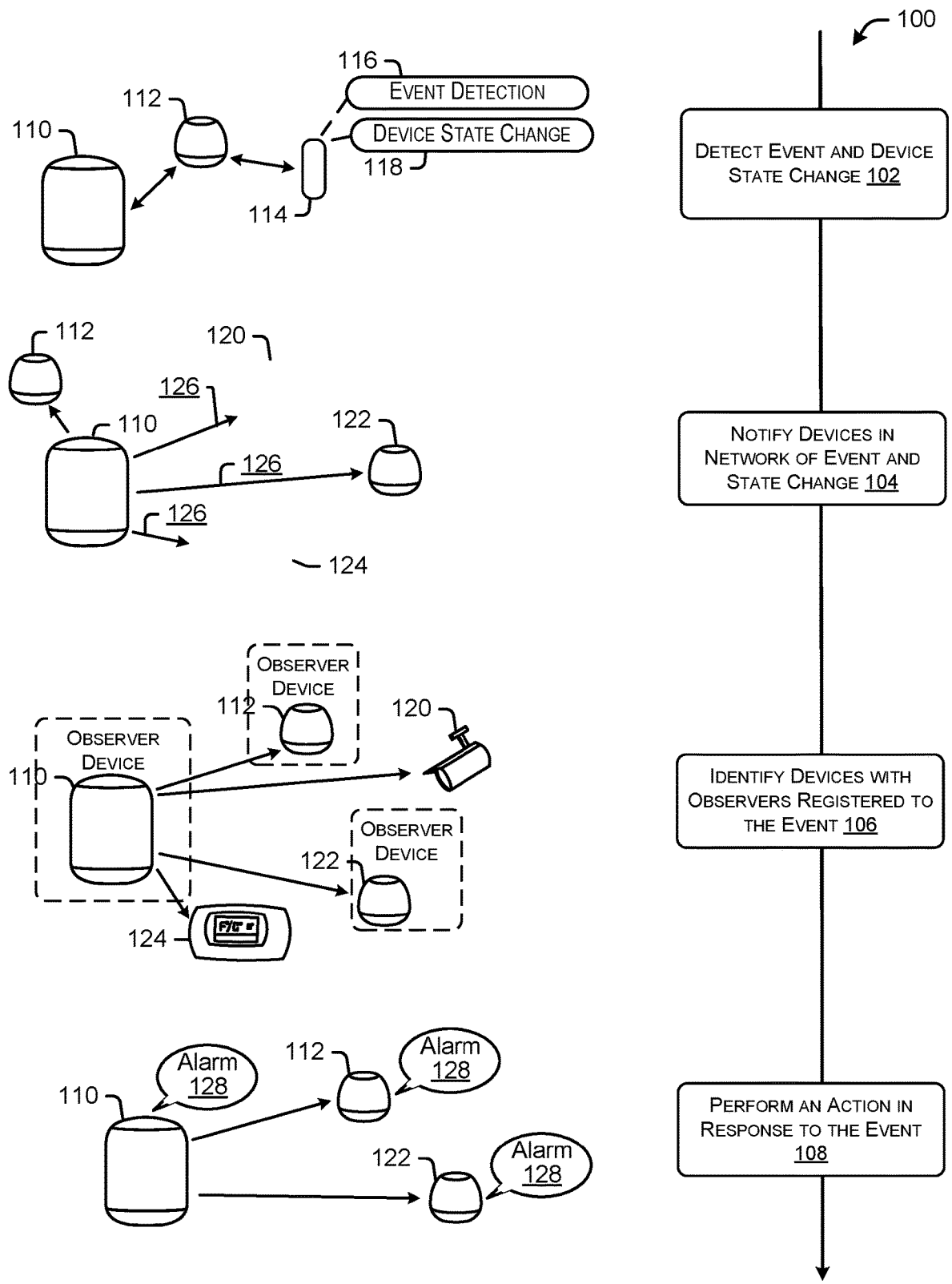
FIG. 1 illustrates a flow process for coordinating state information between devices in a network, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

The described techniques relate to coordinating state information between devices in a network. Particularly, the described techniques can relate to detecting events and state changes of device(s) in a network of user devices and causing actions of observing devices based on the detected events relating to devices in the network.

In some examples, various different user devices may be connected within a network environment (e.g., using Wi-Fi or other networking technology). The network environment may be associated with a specific location (e.g., for a home, office, or school) and may be configured with Internet access from a service provider. A modem or other device may provide the Internet access to one or more access points, which may be used to establish the network within the environment. Examples of the various different user devices that can be connected within the environment include smart phones, smart streaming media devices (e.g., television (TV)-connected devices or standalone smart speakers), tablet devices, or accessories. In some instances, smart phones, smart streaming media devices, and tablets can be configured as controller devices that can control one or more other devices (e.g., the accessories or even the other controller devices). Examples of accessories include speakers, thermostats, televisions, lights, cameras (e.g., security cameras), doorbells, or garage door openers. Other devices may also be configured as controllers and/or accessories, and the two need not mutually exclusive (e.g., some devices may be configured as both controller and accessory). Essentially, any device that can connect to the network environment, and send a control signal, can be a controller, and any device that can connect to the network, receive a control signal from another device, and perform an action (e.g., opening the garage door, turning on, or streaming media) can be an accessory.

In some examples, one or more devices (in some instances, specifically controllers) can be configured as a leader device (e.g., a hub) for a cluster of other devices. For example, one or more clusters of devices may be created based on location or service, and each cluster may have a leader device assigned to the cluster. Examples of clusters can include a kitchen cluster, a media room cluster, an upstairs cluster, or those based on services (e.g., a security cluster for security equipment or a movie cluster for devices with specific settings to enhance movie watching).

Additionally, each user device within the network environment may be aware of its own state and may be able to detect and/or trigger events. Examples of states for devices may include "set" (e.g., for an alarm or timer), "on" (e.g., for a light), "open" (e.g., for any type of door or window), "streaming" (e.g., for a media device), or "capturing" (e.g., for a camera device). Examples of events may include "notification" (e.g., for an alarm or timer), "activated" (e.g., for a sensor such as a doorbell or motion detector), or "changed" (e.g., for a light, door, or window). Further, each device within the network may be configured to report its state and/or any events detected or triggered to all other devices within the network environment. This may be implemented by configuring each device to report respective state/event information to the leader of the cluster with which the device is associated. Once the leader device collects this information, it can be reported to other leaders of other clusters, and those cluster leaders can share that information with the devices within each respective cluster. For example, a doorbell may update the leader of its cluster that it detected activation by indicating the event. Simultaneously, a security camera associated with the doorbell may update the same leader that its state has changed to "streaming." The leader of this cluster can then share that information with a second leader of a second cluster, and that second leader can update the other devices in the second cluster. In this way, all devices within the network environment can be made aware of all device states and all events within the network environment.

In some instances, observers may be implemented on various devices within one or more of the clusters. The observers can be configured to listen for particular device state changes and/or particular events, as desired. The observers can also be configured to perform actions based on the detection of states and/or events of interest. In this way, a user can configure certain devices to provide notifications and/or trigger actions based on the occurrence of state changes and/or events of other devices within the network environment.

By way of example, a user may set a timer by speaking into a smart oven (or other accessory) in their kitchen. The user may state, "Computer, set a timer for 15 minutes." A timer application on the smart oven may begin counting down. The timer application may also update its state to "timer" and may transmit this updated state information to a leader device in the kitchen (e.g., a smart speaker that is nearby and configured as the leader for all devices in the kitchen). The kitchen leader device can then transmit this updated state to other leader devices in the house (e.g., a second leader in the upstairs bedroom). The upstairs bedroom leader can then share this information with all accessories in the upstairs bedroom (or other cluster with which the upstairs bedroom leader is connected). Additionally, one or more devices in the upstairs bedroom may be configured with a timer observer. For example, a smart alarm clock on a bedside table may be configured with an observer that is listening for timers. Similar to the propagation of state information of the timer, when the timer goes off at the end of the fifteen minutes, the event that indicates "notification" may be propagated to all devices in the network environment. Because the alarm clock upstairs has an observer listening for this, it can alert the user that the timer has expired. In this way, regardless of where the user is when the timer goes off, and independent of which device receives the request (e.g., oral, in this case, but via a user interface in others), a device within the network environment can be configured to notify the user. A similar example could be given for a morning alarm, where the user can set an alarm for the morning with any device within the network environment (e.g., on their smartphone or speaking to their garage door opener), and the alarm clock in their bedroom may be able to observe the trigger (e.g., the occurrence of the time), and alarm (e.g., notify) the user.

FIG. 1 illustrates a flow process 100 for coordinating state information between devices in a network. At block 102, a device 114 in a network of devices can detect an event 116 and a state change 118. For example, the device 114 can be configured as a network-accessible doorbell. In this example, the device 114 can identify an event specifying that the doorbell has been triggered (e.g., by a user pressing a button on device 114 or a user being within a threshold proximity to device 114). As another example, device 114 can be configured as a different type of device (e.g., a music streaming device) and can obtain an input from a user (e.g., via text, selection on an interface of the device 114, or voice) to set an alarm (e.g., to enable a notification at a particular time, like a wake-up alarm). Other example events can include detecting a request to play audio content (e.g., music) or launching any application executing on device(s) in the cluster. In this example, the event can include a triggering of the alarm (e.g., based on reaching the time set for the alarm).

The device 114 can also specify a change to the state of the device. For example, the device 114 can change its state to an activated state in response to receiving an input (e.g., the doorbell being triggered or an alarm being set). The event and/or state information can be provided to a leader device 110. In some instances, device 114 can forward the event and/or state information to the leader device 110 via device 112. As described in greater detail below, the devices in the network can form a mesh network, allowing for data communication between devices in a network.

The leader device 110 can be a device capable of coordinating state information between devices in the network environment and eventually between devices in clusters (e.g., mini-networks within the network environment). The leader device 110 can be selected from the user devices in the network environment based on various parameters of the user devices (e.g., network capabilities of the user device, software features available to the user device, or processing capabilities of the user device). In response to a leader device no longer being available in the network environment, a new leader device can be selected from the remaining user devices in the network environment. While referred to as a mini-network above, this term is not intended to imply that clusters need to be subsets of (e.g., smaller than) the network environment. For example, one example of a cluster may include a user's mobile phone while they are physically outside of the network environment. In this way, the mobile phone can be its own leader, can receive state and/or event information from another leader within the network environment (e.g., that is connected to the Internet), and can be configured with an observer. When information is received by the mobile phone that identifies a device state and/or event for which the observer is listening, the mobile phone may perform an action (e.g., notifying the user) even though the user and the mobile phone are physically outside (and, thus, not necessarily a "mini" version of) the network environment.

At block 104, the leader device 110 can forward event and/or state information 126 to devices in the network (e.g., devices 112, 120, 122, 124). Devices 112, 120, 122, and 124 can include network-accessible accessory devices (e.g., sensors, speakers, smart thermostat, or video-enabled doorbell). In some instances, the leader device 110 can forward the event and/or state information 126 to leader devices of another cluster to be forwarded to other devices in the other cluster.

As described in greater detail below, a number of devices are observing devices, which include devices that are registered to perform an action based on the specified event and/or state information 126. As an example, if the event obtained from a doorbell specifies an interaction with a doorbell, the action to be performed is an audio output (e.g., chime) by a second device in the network. In this example, the second device can be registered as an observer device monitoring for an event comprising an interaction with the doorbell. In response, the second device can be configured to perform an action based on the event, such as output a chime, turn on a light, or send a notification to a mobile device.

At block 106, the observer devices in the network can be identified. The observer devices can be configured to monitor for specific events and perform an action based on identifying the event. For example, the observer devices can include leader device 110, device 112, and device 122. While all devices in a cluster (e.g., the mini-network noted above) can obtain the event/state information, only observer devices may be configured to perform an action in response to the event/state information.

At block 108, the observer devices can perform an action in response to receiving the event and/or state information. The observer devices can be configured to perform actions specific to the event detected. For example, actions can include providing an audio output, turning on a light/display, triggering another device to perform an action (e.g., turn on a light on another device), sending a notification to a mobile device, or obtaining and displaying video data from a video-enabled device (e.g., display video from a video-enabled doorbell to view who triggered the doorbell or any motion occurring in the view of the camera).

The present embodiments can coordinate event and/or state information of a device across other devices in the network environment. For example, responsive to detecting an event comprising triggering an alarm at a first device, a leader device can forward the event data to other devices in the network. A number of registered observer devices can monitor for the event and perform an action that corresponds to the event type. Such coordination of event and/or state data across devices in the network can increase computing efficiency of devices in the network and reduce latency in data communication across the network.

I. Network Environment

Figure 2:
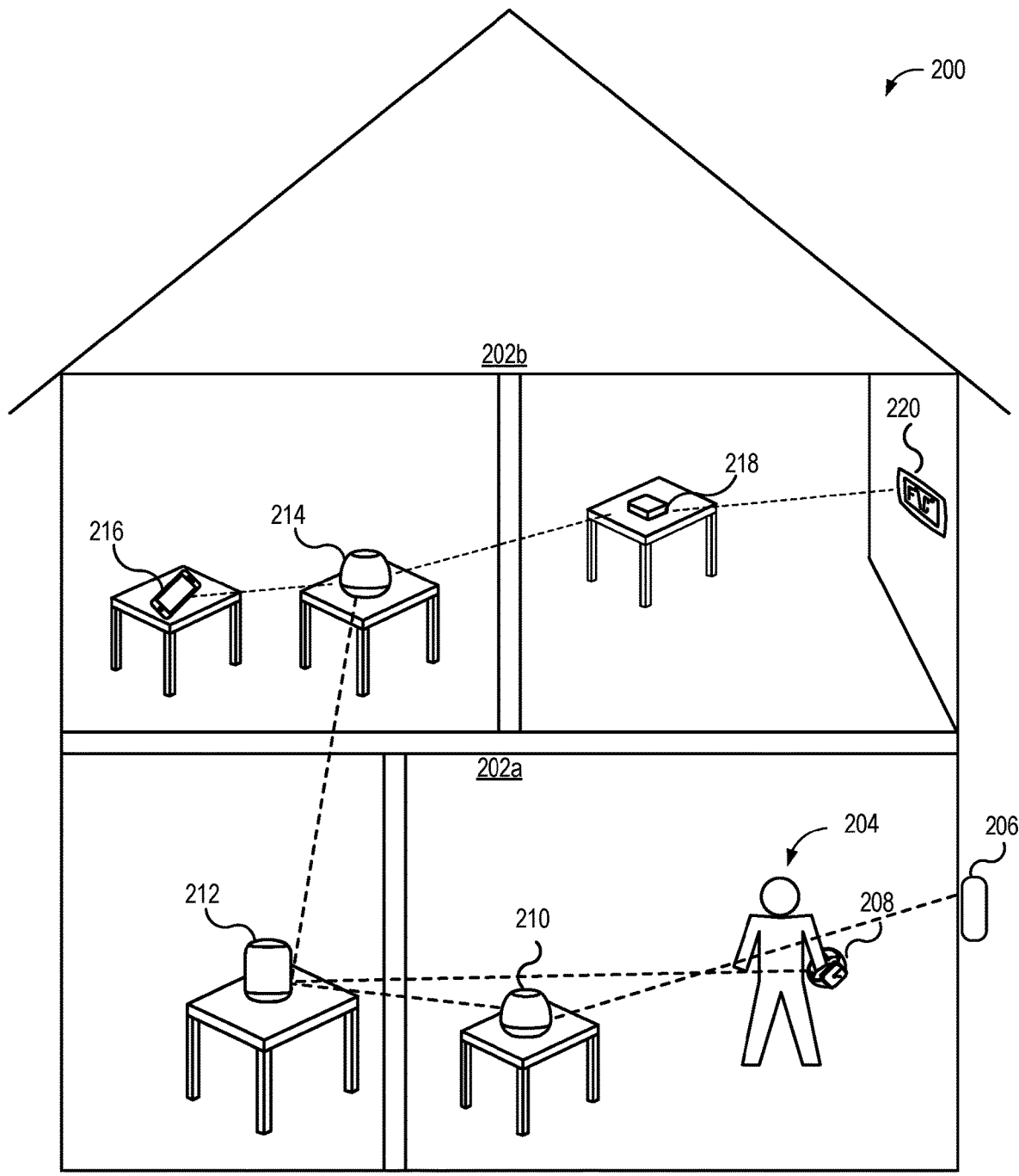
FIG. 2 illustrates an example network environment, according to some embodiments.

FIG. 2 illustrates an example network environment 200. As shown in FIG. 2, the network environment can include a number of clusters 202a-b. Each cluster 202a and 202b can include a leader device and a number of accessory devices. For example, cluster 202a can include leader device 212 and accessory devices 206, 208, and 210. In this example, cluster 202b can include leader device 214 and accessory devices 216, 218, and 220.

Clusters in the network environment 200 can be separated by region. For example, a first cluster 202a can comprise devices in a first region (e.g., lower level) of a home network and a second cluster 202b can comprise devices in a second region (e.g., upper level) of the home network. In some embodiments, clusters can include devices across multiple networks. For example, a first cluster can include devices in a first home network, a second cluster can include devices in a second home network, and a third cluster can include devices in a vehicle network. In many instances, devices (e.g., a mobile phone, tablet computer, or wearable device) can move between clusters within the network(s). Devices can communicate with external networks (e.g., the internet) using a network interface (e.g., wireless router). Devices in the network environment can each be capable of communicating with and through communications networks (e.g., the Internet, wide area networks (WANs), metropolitan area networks (MANs), local area networks (LANs), wireless area networks (WiLANs), radio access network (RANs), public switched telephone network (PTSN), and/or combinations of the same). Devices in the network environment can also communicate directly with other devices in the network environment without utilizing a communications network.

Devices within the network environment can form mesh networks. A mesh network can include a device environment allowing for data forwarding between devices in a network. For example, in a first cluster 202a, data can be transmitted from leader device 212 to accessory device 206 via device 210. The mesh networks can include multiple routing paths across the networks to forward data to devices in the network. In some instances, a leader device can specify routing paths for data transmission across the cluster. These services provided by the mesh can be made available then through a separate application programming interface (API) (i.e., clients do not call directly into the mesh, clients call an API abstraction on top of the mesh). To integrate with other subsystems within the network, the mesh can elect a leader which is responsible for maintaining data communication between devices and synchronizing data between devices in the cluster.

Data can be transmitted between clusters via leader devices. For example, in response to obtaining event data from device 206, leader device 212 can forward the event data to a leader device of the second cluster 214. In response, the leader device of the second cluster 214 can forward the event data to accessory devices 216, 218, and 220 in the second cluster.

Each cluster can include a leader device. For example, cluster 202*a* can include leader device 212, and cluster 202*b* can include leader device 214. Leader devices for each cluster can perform specific processing tasks for a cluster, such as direct data between devices in the cluster, coordinate state information of the devices in the cluster, or derive cluster capability information as described herein. In some embodiments, the leader device can be changed from a first device to another device in the cluster responsive to a triggering event (e.g., the leader device leaving the network environment or another device entering the cluster).

The leader device can be chosen from the user devices in the cluster. The devices in the cluster can include a unique ID that specifies the device and characteristics of the device (e.g., a device type, device class, whether the device is wired or wireless, or battery powered).

Figure 3:
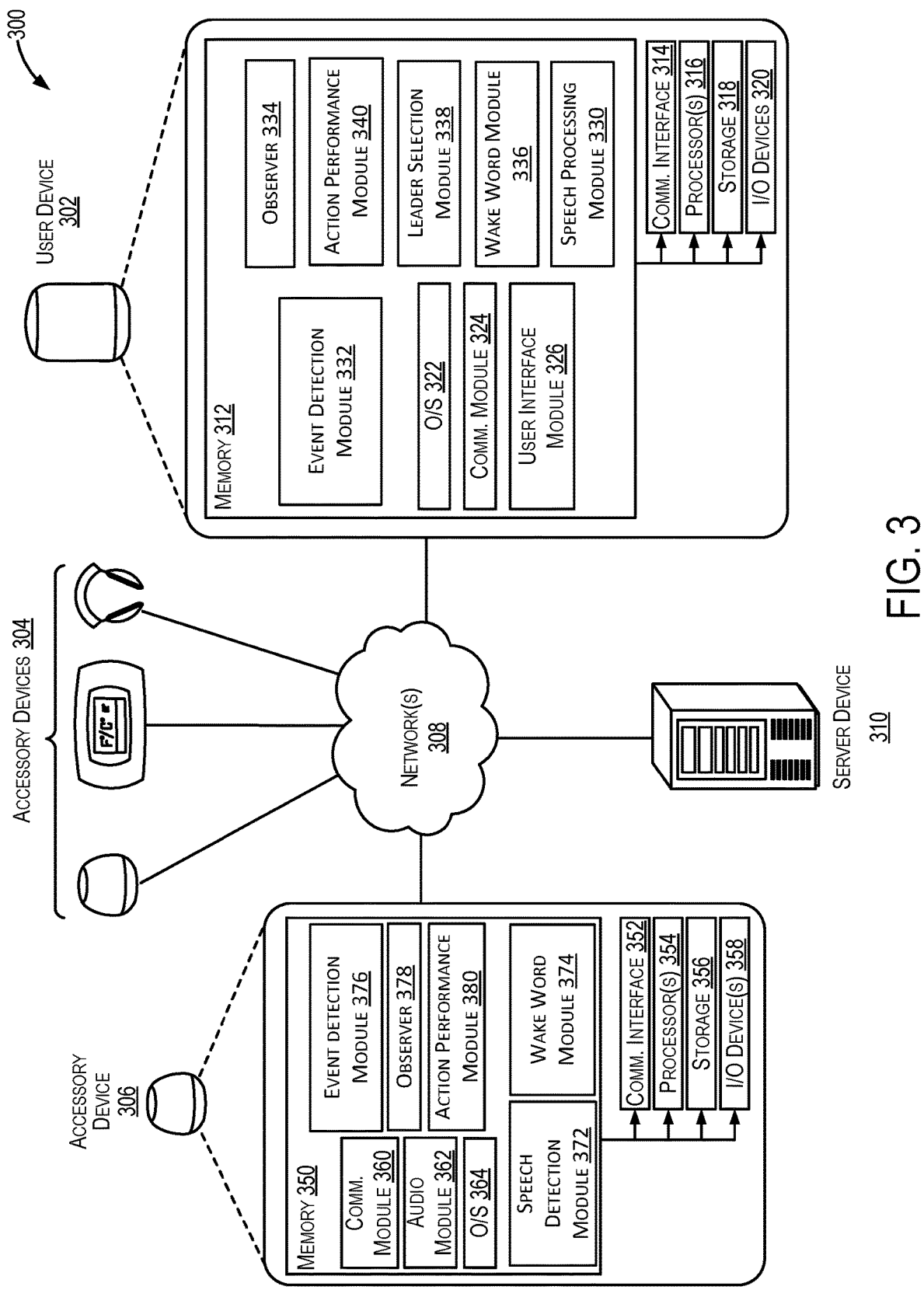
FIG. 3 is a simplified block diagram illustrating an example architecture of a system used to detect and act upon a user request, according to some embodiments.

FIG. 3 is a simplified block diagram 300 illustrating an example architecture of a system used to detect and act upon a user request, according to some embodiments. The diagram includes a representative user device 302, one or more accessory devices 304, a representative accessory device 306, one or more network(s) 308, and a server device 310. Each of these elements depicted in FIG. 3 may be similar to one or more elements depicted in other figures described herein. In some embodiments, at least some elements of diagram 300 may operate within the context of a home environment (e.g. environment 200 of FIG. 2).

The accessory devices 304 and representative accessory device 306 may be any suitable computing device (e.g., smart speaker, smartwatch, smart thermostat, or camera). In some embodiments, an accessory device may perform any one or more of the operations of accessory devices described herein. Depending on the type of accessory device and/or location of the accessory device (e.g., within the home environment or outside the home environment), the accessory device may be enabled to communicate using one or more network protocols (e.g., a Bluetooth connection, a Thread connection, a Zigbee connection, or a WiFi connection) and network paths over the network(s) 308 (e.g., including a LAN or WAN), described further herein.

In some embodiments, the server device 310 may be a computer system that comprises at least one memory, one or more processing units (or processor(s)), a storage unit, a communication device, and an I/O device. In some embodiments, the server device 310 may perform any one or more of the operations of server devices described herein. In some embodiments, these elements may be implemented similarly (or differently) than as described in reference to similar elements of user device 302.

In some embodiments, the representative user device 302 may correspond to any one or more of the user devices described herein. For example, the user device 302 may correspond to one or more of the user device network as illustrated in FIG. 2. The representative user device may be any suitable computing device (e.g., a mobile phone, tablet, a smart hub speaker device, or a smart media player communicatively connected to a TV).

In some embodiments, the one or more network(s) 308 may include an Internet WAN and a LAN. As described herein, the home environment may be associated with the LAN, whereby devices present within the home environment may communicate with each other over the LAN. As described herein, the WAN may be external from the home environment. For example, a router associated with the LAN (and thus, the home environment) may enable traffic from the LAN to be transmitted to the WAN, and vice versa. In some embodiments, the server device 310 may be external to the home environment, and thus, communicate with other devices over the WAN.

As described herein, user device 302 may be representative of one or more user devices connected to one or more of the network(s) 308. The user device 302 has at least one memory 312, a communications interface 314, one or more processing units (or processor(s)) 316, a storage unit 318, and one or more input/output (I/O) device(s) 320.

Turning to each element of user device 302 in further detail, the processor(s) 316 may be implemented as appropriate in hardware, computer-executable instructions, firmware or combinations thereof. Computer-executable instruction or firmware implementations of the processor(s) 316 may include computer-executable or machine executable instructions written in any suitable programming language to perform the various functions described.

The memory 312 may store program instructions that are loadable and executable on the processor(s) 316, as well as data generated during the execution of these programs. Depending on the configuration and type of user device 302, the memory 312 may be volatile (such as random access memory (RAM)) or non-volatile (such as read-only memory (ROM) or flash memory). In some implementations, the memory 312 may include multiple different types of memory, such as static random access memory (SRAM), dynamic random access memory (DRAM) or ROM. The user device 302 may also include additional storage 318, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 318 may be utilized to store data contents received from one or more other devices (e.g., server device 310, other user devices, accessory devices 304, or the representative accessory device 306). For example, the storage 318 may store accessory management settings, accessory settings, and user data associated with users affiliated with the home environment.

The user device 302 may also contain the communications interface 314 that allows the user device 302 to communicate with a stored database, another computing device or server, user terminals, or other devices on the network(s) 308. The user device 302 may also include I/O device(s) 320, such as for enabling connection with a keyboard, a mouse, a pen, a voice input device, a touch input device, a display, speakers, or a printer. In some embodiments, the I/O devices(s) 320 may be used to output an audio response or other indication as part of executing the response to a user request.

The memory 312 may include an operating system 322 and one or more application programs or services for implementing the features disclosed herein, including a communications module 324, a user interface module 326, an event detection module 332, an observer 334, an action performance module 340, a leader selection module 338, and a wake word module 336.

The communications module 324 may comprise code that causes the processor(s) 316 to generate instructions and messages, transmit data, or otherwise communicate with other entities. As described herein, the communications module 324 may transmit messages via one or more network paths of network(s) 308 (e.g., via a LAN associated with the home environment or an Internet WAN).

The event detection module 332 can comprise code that causes the processor(s) 316 to detect an event relating to the device. The event detection module 332 can process sensor data provided by I/O devices 320 and determine whether an event has occurred. As described herein, the events can include a triggering of an alarm, triggering of a timer, or detecting an interaction of a doorbell. The event can be associated with a state change of the device as described herein.

The observer 334 can comprise code that causes the processor(s) 316 to monitor obtained event data and determine whether a device is registered for the event. The observer 334 can comprise an application executing on the device or capable of communicating with other modules/applications of the device via an API. In some instances, the observer 334 can include a listing of event types and devices that are to be monitored by each device. This data can be compared with received event data to determine whether the observer is registered for the event and to perform an action in accordance with the event.

The action performance module 340 can comprise code that causes the processor(s) 316 to execute an action in accordance with a detected event. For example, the action performance module 340 can interact with an audio module 362 to output audio content or interact with a communication module 360 to obtain video content to be displayed by a display of the device. The action can be identified as corresponding with the event. In some instances, the action performance module 340 can maintain or access a listing of actions that correspond with each event type.

The leader selection module 338 can comprise code that causes the processor(s) 316 to select a leader device of a number of devices in a network. As described herein, a leader device can be selected to perform various tasks, such as coordinate event and/or state information. The leader selection module 338 can obtain various capability information from other devices in the network and select a leader device based on the received capability information. Example capability information can include a device type, applications executing on each device, a processing capacity of each device, a network throughput capability of each device, or a power capacity of each device. In some instances, responsive to a leader device leaving a network, another device can be selected as a leader device.

The user interface module 326 may comprise code that causes the processor(s) 316 to present information corresponding to the accessory devices and user devices present within a home environment. For example, the user interface module 326 can present a graphical representation of user devices and the accessory devices currently associated with each accessory device. In some embodiments, the user interface module 326 can allow a user to provide configuration information about a new accessory device to be added to a home environment or allow the user to select user devices or accessory devices for removal from the home environment.

The speech processing module 330 can comprise code that causes the processor(s) 316 to receive and process an audio input corresponding to speech or other sound amenable to analysis by techniques described herein. Wake word module 336 can comprise code that causes processor(s) 316 to receive and process a portion of an audio input corresponding to a trigger or wake word. For example, wake word module 336 can analyze a portion of an audio input to determine the presence of a wake word. The speech processing module can also, in some embodiments, determine a language corresponding to the audio input and use that language to inform the analysis of the wake word portion.

Turning now to the details of the representative accessory device 306, the accessory device 306 can have, in some embodiments, at least one memory 350, a communications interface 352, processor(s) 354, a storage unit 356, and I/O devices 358. As described herein with respect to the user device 302, these elements of the accessory device can have the same appropriate hardware implementations as their counterparts on the user device 302.

The memory 350 of the accessory device 306 can include an operating system 364 and one or more application programs or services for implementing the features disclosed herein, including communications module 360 and audio module 362. As described herein with respect to the user device 302, the communications module 360 can have similar appropriate functionality as its counterpart communications module 324.

The audio module 362 may comprise code that causes the processor(s) 354, in conjunction with the I/O devices 358, to receive, process, and transmit audio signals. For example, the audio module 362 can receive a user utterance or other audio input at a microphone with the I/O devices 358 and transmit that audio data to the user device 302 over a streaming audio channel or other suitable connection. The audio module 362 can also receive response audio from the user device 302 and play that audio at a speaker within the I/O devices 358.

The memory 350 can include event detection module 376 including features similar to event detection module 332. The memory 350 can also include observer 378 including features similar to observer 334. The memory 350 can also include action performance module 380 including features similar to action performance module 340.

The memory 350 can comprise a speech detection module 372 and wake word module 374. Wake word module 374 can comprise code that causes processor(s) 354 to receive and process the wake word. For example, wake word module 374 can analyze a portion of an audio input to determine the presence of a wake word.

II. Performing Actions Based on Coordinated State and Event Information

Figure 4:
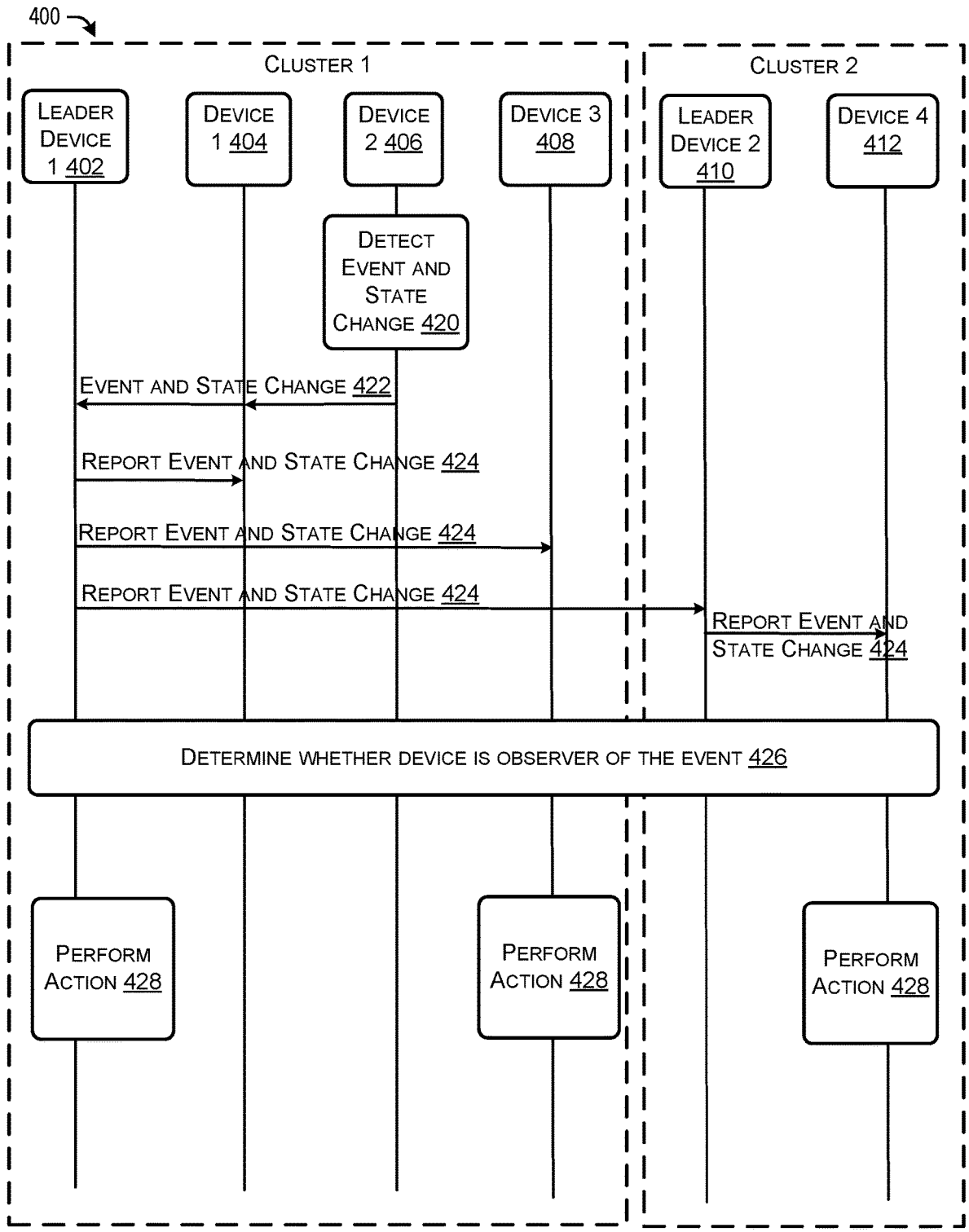
FIG. 4 illustrates an example signaling process for coordinating state information across devices in a network, according to some embodiments.

FIG. 4 illustrates an example signaling process 400 for coordinating state information across devices in a network (e.g., the network environment described above). As shown in FIG. 4, a first cluster can include a first leader device (e.g., leader device 1 402) and devices (e.g., device 1 404, device 2 406, and device 3 408. A second cluster can include a second leader device 2 410 and accessory device 4 412.

At block 420, a device in the network (e.g., device 2 406) can detect an event and/or a state change of the device. For example, an event can include an initiation of an alarm (e.g., via an interface on the device 406 or speech by a user using a voice assistance software) or a triggering of a doorbell (e.g., by interacting with the doorbell or detecting motion at the doorbell).

In response to detecting the event, the device 2 406 can change a state of the device indicating that an event has been triggered. The state of the device 2 406 can identify that the device has detected the event. For example, the state of the device 2 406 can change from an inactive state to an active state corresponding to detecting the event. The state information can be indicative of an event type.

At 422, the leader device 1 402 can obtain the event and/or state information from the device 2 406. In some instances, the event and/or state change data can be obtained at leader device 1 402 from device 2 406 via device 1 404 (e.g., using a mesh network). The leader device 1 402 can process the event and/or state information to identify an event type, a timestamp associated with the event, or a device originating the event. In some embodiments, the leader device 1 402 can persist the event and/or state information as described herein.

At 424, the leader device 1 402 can forward the event and/or state change data to all devices in the network (e.g., devices 404, 408, and 410). In some instances, the leader device 1 402 can send the event and/or state data to a leader device 2 in the second cluster 410. In response, the leader device 2 of the second cluster 410 can forward the event and/or state data to a device 4 in the second cluster 412.

At block 426, it can be determined whether each device is an observer of the event. This can include determining whether an observer of each device is registered for the event. As described in greater detail below, the observer can include an application or module executing on each device monitoring event and/or state information to determine whether the observer is registered for specific events/state changes.

As described in greater detail below, determining whether each device is an observer of the event can include comparing an event type and a device originating the event with a listing of observer data indicating events registered to each user device. For example, a user device comprising a speaker is configured to perform an action (e.g., sound an alarm) responsive to an observer of the speaker determining that the event information corresponds with a listing of observer data for the observer.

The network can include one or more devices with an observer registered to the event. For example, in the embodiment as shown in FIG. 4, leader device 1 402, device 3 408, and device 4 412 can comprise observer devices that are registered for the event. Other devices in the network (e.g., 404 and 410) can include observers that can process the event data and determine that the devices are not observers for the event.

At block 428, an action can be performed by all devices with observers registered to the event. For example, the action can include initiating an output (e.g., audio output, display content, or turn on a light), sending a notification to another device, or triggering another device to perform an action.

In some embodiments, multiple devices can include observers registered to an event. For example, in response to an event comprising detecting initiation of a doorbell, a speaker located in a first room of an environment (e.g., home network) and a smart hub device located in a second room of the environment can include observers registered to the event. In such embodiments, network context information can be used to determine a device to perform the action.

The network context information obtained from the devices in the network can provide insights into devices in the network and locations of the devices within the network. As an example, the context information obtained from devices in the network can specify a location of a user in the network or a location of an ephemeral device (e.g., a mobile phone) in the network. For instance, the context information can specify that a mobile device is in an active state (e.g., in use by the user) and the mobile device is located in a room of the home network. The context information can be used to identify a device to perform the action corresponding with the event. For example, the context information can specify that the user (or a device in the network) is located in a first room and a speaker located in the first room can be selected to perform the action (e.g., sound a chime).

III. Event Creation

Figure 5:
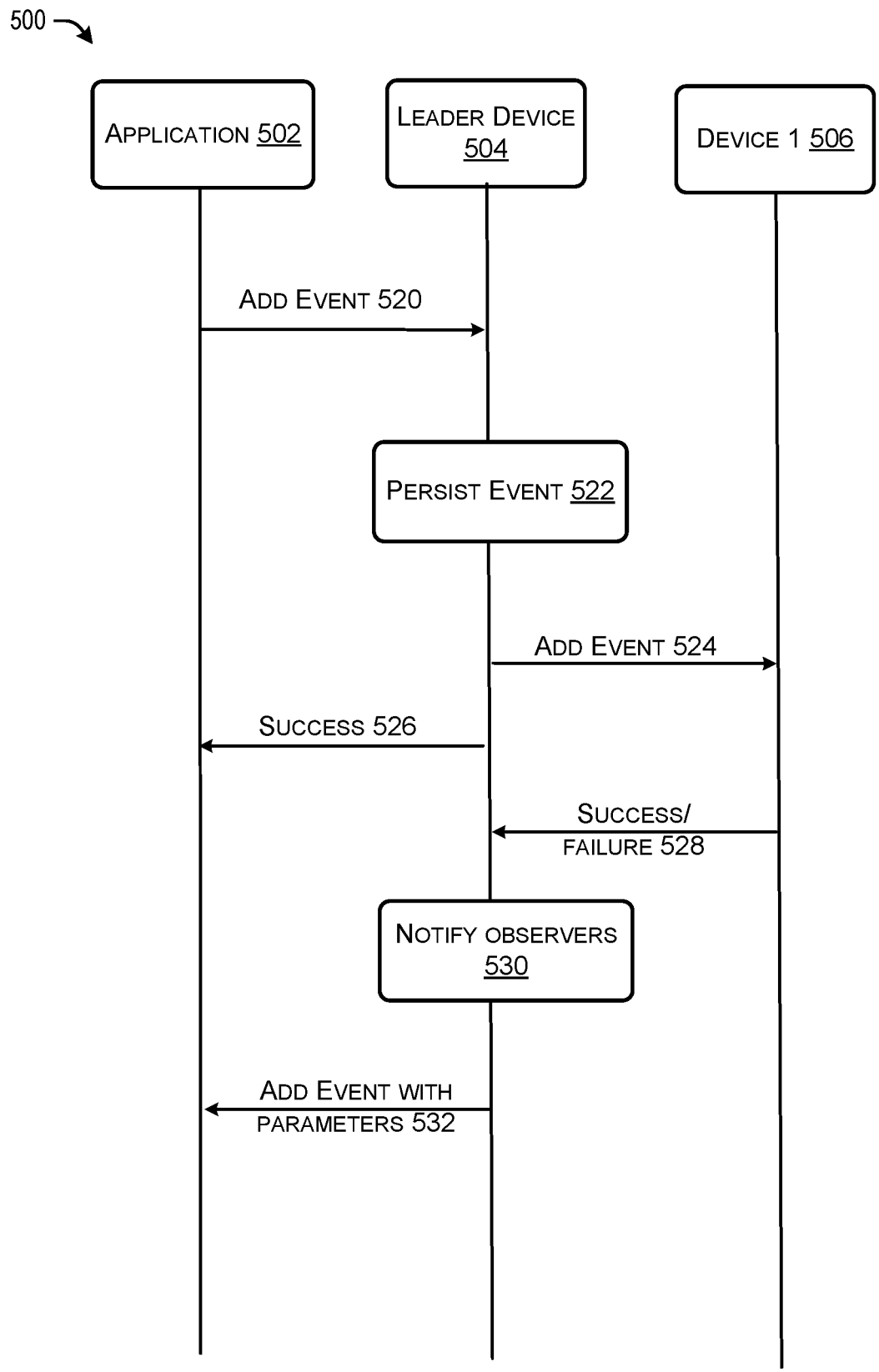
FIG. 5 illustrates an example signaling process for creating an event, according to some embodiments.

FIG. 5 illustrates an example signaling process 500 for creating an event. As described herein, an event can be detected by a device, and the event can include triggering of an alarm, a timer, or identifying an interaction with a doorbell. In the embodiment as shown in FIG. 5, a leader device 504 and an application 502 can interface via an application programming interface (API).

The leader device 504 can perform synchronization between a data store and an application 502 such that any events added or removed (e.g., a new alarm added by a user via a voice command or a timer turned off by a user via a voice command) are replicated/removed between the data store and application 502. The data store can be maintained by leader device 504 or maintained by another device that is accessible to the leader device 504. The application can communicate with leader device 504 via an API as an ephemeral type node to add and retrieve event information. For example, the observer application can obtain event information from the leader device via an API. In this example, the observer application can process the event information to determine whether the observer corresponds to the event.

In some embodiments, in the event of a device in the cluster failing (e.g., an application crashing, a device powering down, roaming out of communication range), the state of the device can be removed from all maintained state information relating to the devices in the cluster. For example, a device can stream music and can set its state as streaming audio content. Responsive to the device being unplugged, the state information can be removed by the leader device and observers can be notified of the state change. The leader device can re-poll remaining nodes upon detecting such a change of devices in the cluster.

At 520, the application 502 can send a message adding an event to leader device 504. The event can be added via an interaction with a device detected by the application 502, such as identifying a text input from a user, detecting an audio input (e.g., via a voice assistant), or detecting motion at the device. The event information can allow for creation of the event with parameters relating to the event. The parameters relating to the event can include an event type or a device/application originating the event.

The application 502 can send the message adding the event to the leader device 504 via an API. The API can include an interface between the application 502 (e.g., an event generation application, an observer application) and the leader device 504 (e.g., via a daemon of the leader device) such that data can be communicated using parameters allowing data communication between application 502 and leader device 504. For instance, the message adding the event can be sent responsive to an API method call identifying parameters to communicate the message to the leader device 504. In some instances, on devices running in the cluster (e.g., leader device 504), the application 502 can communicate with a process (e.g., a daemon process) running the cluster via the API. In other instances, the process can act as an ephemeral node and communicate directly with the cluster.

In some embodiments, responsive to detecting the event, the application 502 and/or leader device 504 can determine whether the event is part of a set of devices working together (e.g., a stereo pair). The application 502 and/or leader device 504 can also determine if a stereo pair leader is outputting content in response to the event to account for any time offsets or a stereo pair leader being offline.

At block 522, the leader device 504 can persist the event. Persisting the event can include storing the event as data in a storage module (e.g., maintained by the leader device 504 or by another device accessible to leader device 504).

At 524, the leader device 504 can transmit information identifying the event to another device (e.g., device 1 506).

At 526, the leader device can send a success message to the application 502 via API. If the leader device determines that a call to persist the event data is successful, the success message can indicate a successful persistence of the data. If the call failed, failure reasons can be returned.

At 528, the device 1 506 can return a success/failure message to the leader device. The success/failure message can indicate that the persistence of the data was successful.

At block 530, after changes have been persisted, the leader device 504 can notify all observers of the changes. Additionally, the leader device 504 can be responsible for observing changes from the underlying service in case changes propagate from elsewhere in the system and notify all observers of these changes as well.

At 532, the leader device 504 can notify the application of the added event with the event parameters. The added event message can indicate a successful detection of the event data and successful persistence of the data.

Figure 6:
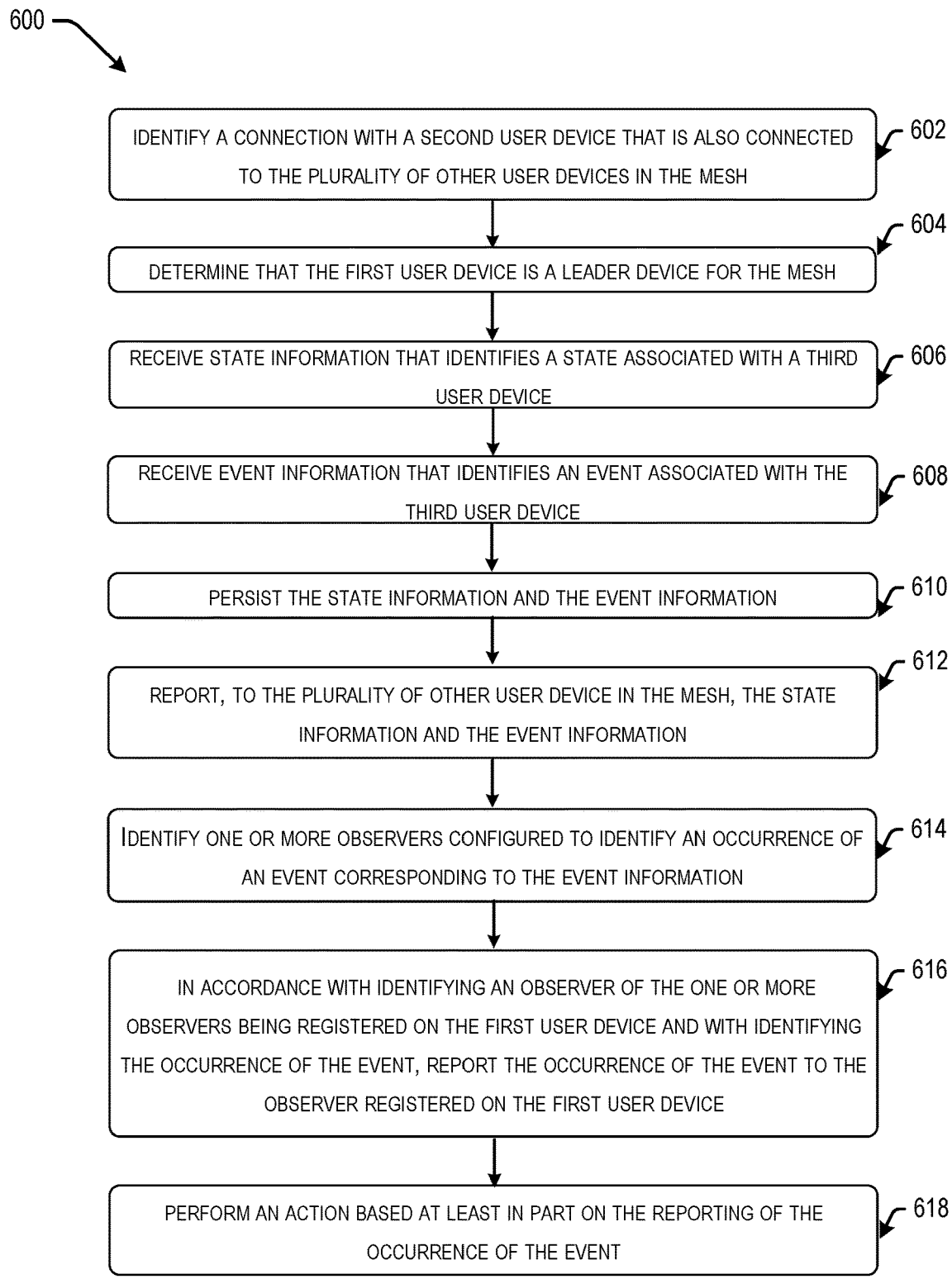
FIG. 6 is a flow process for coordinating event and/or state information between devices in a network, according to some embodiments.

IV. Example Method for Coordinating Event and/or State Information Between Devices in a Network FIG. 6 is a flow process for coordinating event and/or state information between devices in a network. At block 602, the first user device can identify a connection with a second user device. The first user device and the second user device can include network-accessible devices included in a plurality of user devices. In some instances, the first user device and second user device can be part of a cluster of devices and/or comprise a mesh network. In identifying the connection with the second user device, the first user device can obtain information identifying the second user device (e.g., internet protocol (IP) address, device name, or device type).

At block 604, the first user device can determine that the first user device is a leader device for the mesh. As an illustrative example, the first user device can include device 212 as described in FIG. 2. As noted above, the leader device can be selected from devices in the cluster of user devices. The leader device can be selected using a variety of parameters, such as a network capability, software features of the devices, a processing capability, or applications executing on the user device. The leader device can coordinate event and/or state information as described herein.

At block 606, the first user device can receive state information from the second user device that identifies a state associated with a third user device that is connected to the second user device and is outside of the cluster. The third device can include a device connected to the first device via the second device via a Wi-Fi (or mesh) network. The state information can specify a modified state of the third device, such as an initiation of an alert or timer. The state change can specify whether the event has been detected by the device. State information can be specific to each device in the cluster.

As an illustrative example, a third device (e.g., doorbell 206) can detect an initiating of an event (e.g., triggering of the doorbell). Detection of the event can result in a change of a state of the third user device (e.g., from an inactive state to an active state). In response to detecting the event and the state change, the third user device (e.g., doorbell 206) can forward state information to a first user device (e.g., leader device 212) via a second user device (e.g., device 210).

At block 608, the first user device can receive event information from the second user device that identifies an event associated with the third user device. The event information can specify an event type (e.g., launching of a timer by the third user device, launching of an alarm by the third user device, or activation of a doorbell by the third user device) and the device originating the event (e.g., the third user device).

In some instances, at least one of the state information or the event information are represented by a key value pair. The key value pair can specify an event type, state change, or a device detecting the event.

At block 610, the first user device can persist the state information and the event information. This can include storing the data at a storage module accessible to the first user device. The state information can be persisted to identify state changes and events across devices in the network.

At block 612, the first user device can report the state information and the event information to other devices in the network. For example, the first user device can forward the event and/or state information to all devices in a cluster of devices in a mesh. In some instances, the state information and the event information can be shared with a second leader of a second mesh. The second leader device can be configured to forward the event information and state information to user devices in the second cluster.

At block 614, the first user device can identify one or more observers configured to identify an occurrence of an event corresponding to the event information. The one or more observers being registered with the first user device or any of the plurality of user devices in the mesh. Each device can have an observer executing on the devices. The observer can comprise an application or module executing on device(s) in the mesh, for example. For instance, the first user device can include an observer monitoring event and/or state information to determine whether an event corresponds to any event being observed by the observer as registered to the first user device.

In some embodiments, the first user device can compare the event information with a listing of events observed by the one or more observers registered to the first user device to determine whether an event type and the third user device originating the event corresponds with the listing of events observed by the one or more observers registered to the first user device. For example, if a third user device is a doorbell detecting a triggering of the doorbell, the observer for the first user device can monitor for such an event detected by the third device. Accordingly, the observer can determine that an event type and the device detecting the event is registered to each user device. In some instances, an observer for a device can be registered to perform an action based on a specific event.

At block 616, the first user device can report the occurrence of the event to the observer registered on the first user device. This can be performed in accordance with identifying an observer of the one or more observers being registered on the first user device and with identifying the occurrence of the event corresponding to the event information. For example, the first user device can determine that the observer for the first user device is registered to the event and device type.

In some embodiments, it can be identified that the one or more observers is registered to a fourth user device of the plurality of user devices in the mesh. In these embodiments, the fourth user device can perform the action based on identifying that the one or more observers is registered to the fourth user device.

In some embodiments, the observer for each user device can include event occurrence data comprises a listing of event types and a listing of user devices to be monitored by each user device in the network. In such embodiments, the first user device can determine that an event type included in the event information corresponds with the listing of event types in the event occurrence data and that the third user device that identified the event corresponds with devices in the network that is to be monitored as specified in the event occurrence data.

At block 618, the first user device can perform an action based at least in part on the reporting of the occurrence of the event. The action can include any outputting of audio content on the first user device that corresponds to the event, displaying content on the first user device that corresponds to the event, and sending a notification to another user device that specifies the event.

In some embodiments, devices can be registered as observers for an event. For example, a fourth user deice can be registered with the one or more observers as corresponding to the event by providing event occurrence data to the fourth user device that specifies an event type that corresponds to the event and specifies the third user device as identifying the event, wherein the fourth user device is configured to perform the action in response to identifying that the one or more observers are registered to the fourth user device.

V. Conclusion

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, or exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The various embodiments further can be implemented in a wide variety of operating environments, which in some cases can include one or more user computers, computing devices, or processing devices that can be used to operate any of a number of applications. User or client devices can include any of a variety of different types of computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, or flash cards.

Such devices also can include a computer-readable storage media reader, a communications device (e.g., a modem, a network card (wireless or wired), or an infrared communication device), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode. Variations of those preferred embodiments may become apparent to those of ordinary skill in the art upon reading the foregoing description. It is expected that skilled artisans should be able to employ such variations as appropriate, and it is intended for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
    identifying, by a first user device of a plurality of user devices in a mesh, a connection with a second user device that is also connected to the plurality of user devices in the mesh;
    determining, by the first user device, that the first user device is a leader device for the mesh;
    receiving, by the first user device, state information from the second user device that identifies a state associated with a third user device that is connected to the second user device and is outside of the mesh;
    receiving, by the first user device, event information from the second user device that identifies an event associated with the third user device;
    persisting, by the first user device, the state information and the event information;
    reporting, by the first user device to the plurality of user devices in the mesh, the state information and the event information;
    identifying, by the first user device, one or more observers configured to identify an occurrence of an event corresponding to the event information, the one or more observers being registered with the first user device or any of the plurality of user devices in the mesh;
    in accordance with identifying an observer of the one or more observers being registered on the first user device and with identifying the occurrence of the event corresponding to the event information, reporting, by the first user device, the occurrence of the event to the observer registered on the first user device; and
    performing, by the observer registered on the first user device, an action based at least in part on the reporting of the occurrence of the event.

2. The method of claim 1, wherein the event comprises launching of a timer by the third user device, launching of an alarm by the third user device, or activation of a doorbell by the third user device.

3. The method of claim 1, wherein the state information and the event information are configured to be shared, by the second user device, with a second leader of a second mesh.

4. The method of claim 1, wherein at least one of the state information or the event information are represented by a key value pair.

5. The method of claim 1, wherein identifying the one or more observers configured to identify the occurrence of the event corresponding to the event information further comprises:
    comparing, by the first user device, the event information with a listing of events observed by the one or more observers registered to the first user device to determine whether an event type and the third user device originating the event corresponds with the listing of events observed by the one or more observers registered to the first user device.

6. The method of claim 1, wherein identifying the one or more observers configured to identify the occurrence of the event corresponding to the event information further comprises:
    identifying, by the first user device, that the one or more observers is registered to a fourth user device of the plurality of user devices in the mesh, wherein the fourth user device is configured to perform the action based on identifying that the one or more observers is registered to the fourth user device.

7. The method of claim 1, wherein performing the action includes any outputting of audio content on the first user device that corresponds to the event, displaying content on the first user device that corresponds to the event, and sending a notification to another user device that specifies the event.

8. A non-transitory computer-readable storage medium having stored thereon computer-executable instructions that, when executed by a processor of a first user device, cause the processor to perform operations comprising:
receiving event information identifying an event associated with a third user device and state information identifying a modified state associated with the third user device in response to the event;
persisting the event information and the state information;
transmitting the event information and the state information to a plurality of other user devices in a network, wherein at least one or more observers are registered to at least one user device included in the network that corresponds with the event information;
identifying that the one or more observers are registered to at least the first user device by determining that the one or more observers registered to the first user device includes event occurrence data that corresponds with the first user device; and
responsive to identifying that the one or more observers are registered to the first user device, performing an action that corresponds to the event.

9. The non-transitory computer-readable storage medium of claim 8, wherein the event occurrence data comprises a listing of event types and a listing of user devices to be monitored by each user device in the network, wherein determining that the one or more observers registered to the first user device includes event occurrence data that corresponds with the first user device further comprises:
determining that an event type included in the event information corresponds with the listing of event types in the event occurrence data and that the third user device that identified the event corresponds with devices in the network that is to be monitored as specified in the event occurrence data.

10. The non-transitory computer-readable storage medium of claim 8, wherein the computer-executable instructions further cause the processor to perform operations comprising:
determining that the first user device is a leader device of a first cluster of user devices for the network, and wherein the event information and the state information is received from the third user device via a second user device in the first cluster of user devices connecting the first user device to the second user device via a mesh.

11. The non-transitory computer-readable storage medium of claim 10, wherein transmitting the event information and the state information to the plurality of other user devices in the network further comprises:
transmitting the event information and the state information to a second leader device of a second cluster, the second leader device configured to forward the event information and state information to user devices in the second cluster.

12. The non-transitory computer-readable storage medium of claim 8, wherein the computer-executable instructions further cause the processor to perform operations comprising:

registering a fourth user device of the network with the one or more observers as corresponding to the event by providing event occurrence data to the fourth user device that specifies an event type that corresponds to the event and specifies the third user device as identifying the event, wherein the fourth user device is configured to perform the action in response to identifying that the one or more observers are registered to the fourth user device.

13. The non-transitory computer-readable storage medium of claim 8, wherein the event comprises launching of a timer by the third user device, launching of an alarm by the third user device, or activation of a doorbell by the third user device, and wherein performing the action includes any outputting of audio content on the first user device that corresponds to the event, displaying content on the first user device that corresponds to the event, and sending a notification to another user device that specifies the event.

14. A first user device included a cluster of user devices that is configured to coordinate event information and state information between user devices of the cluster of user devices, the first user device comprising:
a memory configured to store computer-executable instructions; and
a processor configured to connect to the memory and execute the computer-executable instructions to at least:
identify a connection with a second user device that is also connected to the cluster of user devices, wherein the first user device comprises a leader device for the cluster of user devices;
receive state information that identifies a state associated with a third user device and event information that identifies an event associated with the third user device from the second user device connected to the third user device via a mesh, wherein at least one of the state information or the event information are represented by a key value pair;
persist the state information and the event information;
report the state information and the event information to a plurality of user devices in the cluster of user devices;
identify one or more observers configured to identify an occurrence of an event corresponding to the event information, the one or more observers being registered with the first user device or any of the plurality of user devices in the mesh;
in accordance with identifying an observer of the one or more observers being registered on the first user device and with identifying the occurrence of the event corresponding to the event information, report the occurrence of the event to the observer registered on the first user device; and
perform an action based at least in part on the reporting of the occurrence of the event.

15. The first user device of claim 14, wherein the event comprises launching of a timer by the third user device, launching of an alarm by the third user device, or activation of a doorbell by the third user device.

16. The first user device of claim 14, wherein transmitting the event information and the state information to the plurality of user devices in the cluster of user devices further comprises:
transmit the event information and the state information to a second leader device of a second cluster, the second leader device configured to forward the event information and state information to user devices in the second cluster.

17. The first user device of claim 14, wherein identifying the one or more observers configured to identify the occurrence of the event corresponding to the event information further comprises:
    comparing, by the first user device, the event information with a listing of events observed by the one or more observers registered to the first user device to determine whether an event type and the third user device originating the event corresponds with the listing of events observed by the one or more observers registered to the first user device.

18. The first user device of claim 14, wherein identifying the one or more observers configured to identify the occurrence of the event corresponding to the event information further comprises:
    identify that the one or more observers is registered to a fourth user device of the plurality of user devices in the mesh, wherein the fourth user device is configured to perform the action based on identifying that the one or more observers is registered to the fourth user device.

19. The first user device of claim 14, wherein performing the action includes any outputting of audio content on the first user device that corresponds to the event, displaying content on the first user device that corresponds to the event, and sending a notification to another user device that specifies the event.

20. The first user device of claim 14, wherein the processor is further configured to execute the computer-executable instructions to at least:
    register a fourth user device of the cluster of user devices with the one or more observers as corresponding to the event by providing event occurrence data to the fourth user device that specifies an event type that corresponds to the event and specifies the third user device as identifying the event, wherein the fourth user device is configured to perform the action in response to identifying that the one or more observers are registered to the fourth user device.

* * * * *